Feb. 23, 1954 E. E. TURNER 2,670,446
MAGNETOSTRICTIVE TRANSDUCER
Filed March 27, 1952 2 Sheets-Sheet 2
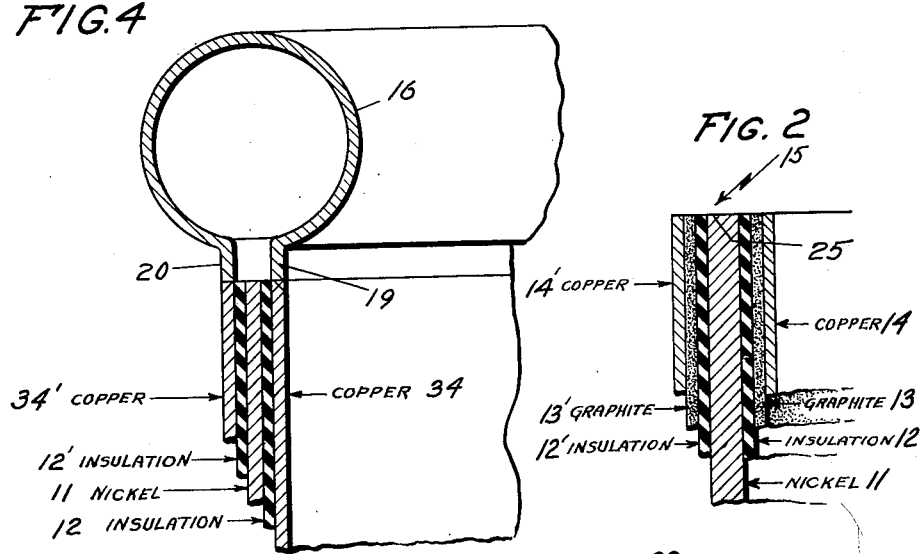
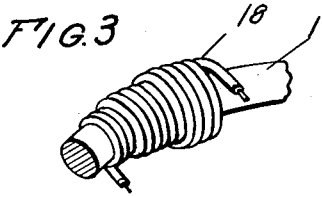
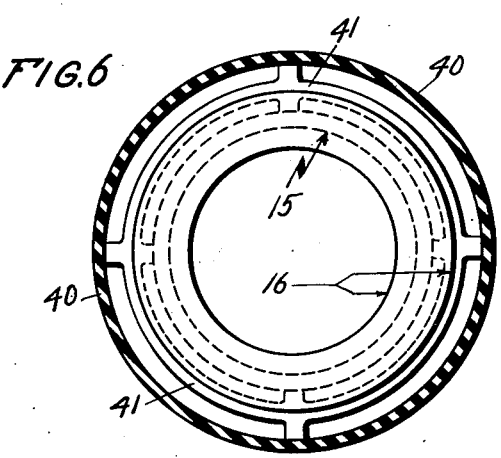
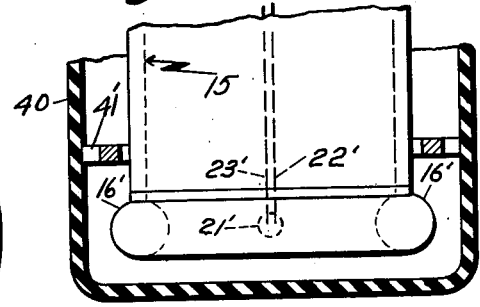
INVENTOR
EDWIN E. TURNER
BY Elmer J. Gorn
ATTORNEY Patented Feb. 23, 1954

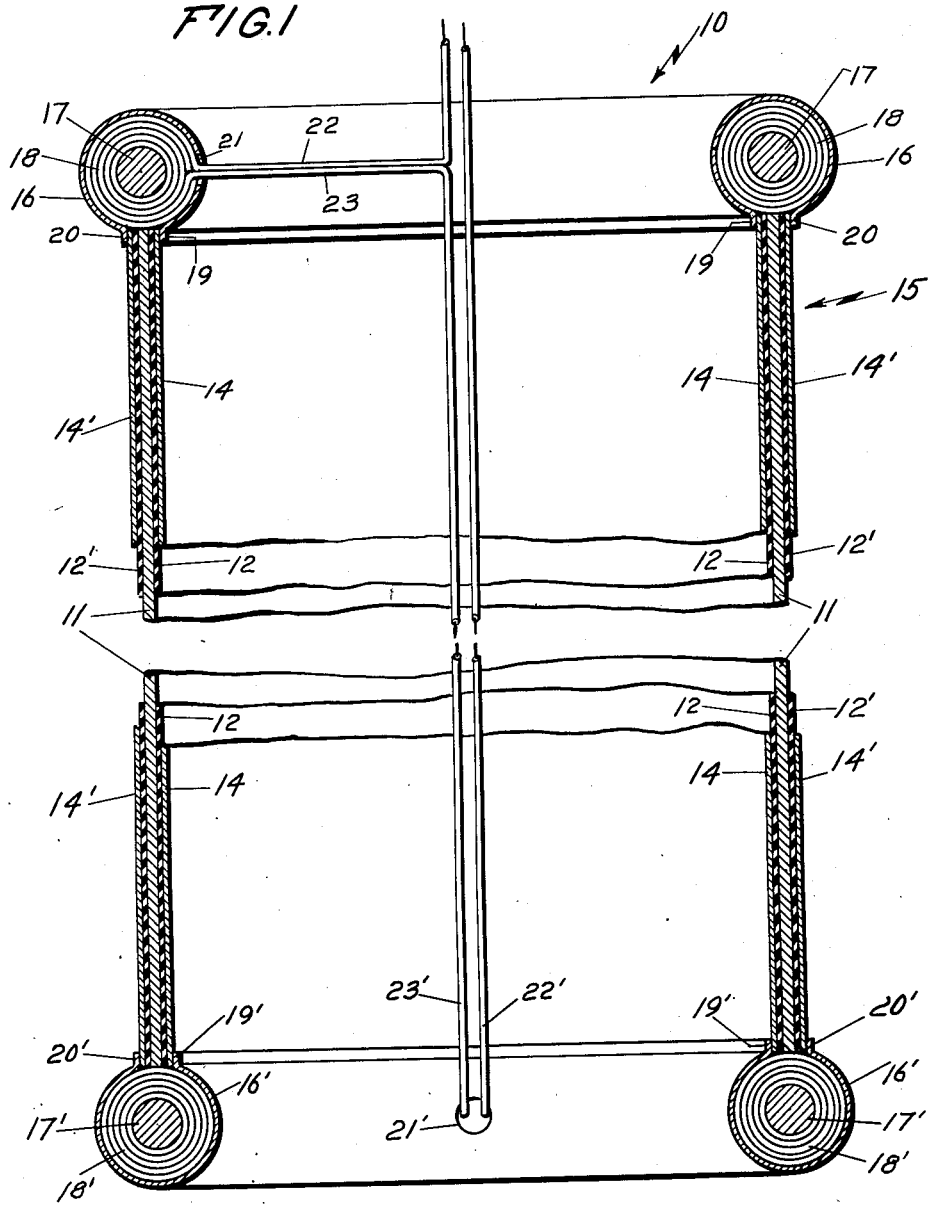

2,670,446

UNITED STATES PATENT OFFICE 2,670,446

MAGNETOSTRICTIVE TRANSDUCER

Edwin E. Turner, West Roxbury, Mass., assignor to Raytheon Manufacturing Company, Newton, Mass., a corporation of Delaware Application March 27, 1952, Serial No. 278,839

10 Claims. (Cl. 310—26)

This invention relates to a magnetostrictive transducer for generating or receiving compressional waves and, more particularly, relates to a tubular magnetostrictive hydrophone for converting compressional wave energy in a fluid medium into corresponding electrical signals or vice versa.

In the field of underwater signaling or detecting mechanical vibrations transmitted through the water in the form of pressure waves, magnetostrictive hydrophones, that is, transducers adapted for use underwater, have been widely used. Certain types of tubular radially vibrating magnetostrictive transducers include a cylindrical tube made of some magnetostrictive material, such as nickel, and a coil comprising a plurality of turns of wire wound about the wall of the tube substantially lengthwise of the tube in the form of a tore so that each turn lies both inside and outside of the tube wall.

If such a transducer is used as a receiver, the magnetostrictive tube will be subjected all around to variations in pressure owing to the compressional waves of energy striking said tube. The latter will vibrate radially because of the impinging compressional waves. If the tube is polarized circumferentially by a magnetic field, the radial expansion and contraction of the tube results in a change of magnetic flux in the tube and, consequently, an electromotive force is induced in the coil surrounding the tube. This electromotive force is then applied to a suitable detecting means. Conversely, if the transducer is to be used as a radiator of compressional wave energy, the magnetostrictive tube may be made to vibrate radially in response to an alternating current signal applied to the transducer coil, thereby radiating compressional waves.

Transducers of this type have certain disadvantages. It is comparatively difficult to wind the coil turns around a long tubular core which may be of the order of three feet in length and only two or three inches in diameter. Furthermore, in order to obtain a reasonably high impedance with a single coil, an excessively large number of turns must be wound about the core, resulting not only in difficulties in construction, but also in an undesirable increase in size and bulk.

Even if primary and secondary windings are wound on this transducer to thereby increase the impedance, the problem of winding a large number of turns around the long slender core still exists.

In addition, the effectiveness of prior magnetostrictive transducers is reduced because the coupling between the magnetostrictive member and the adjacent coil or coils has not been sufficiently close to obtain a high degree of flux linkages between the magnetostrictive field and the coil.

The hydrophone according to this invention surmounts the aforesaid difficulties and will now be described. In a first embodiment of the invention, a partially annealed magnetostrictive tube is completely covered by a thin insulated coating. The coated tube is then covered with a thin layer of graphite and copper plated. The insulated coating, graphite layer and copper plate at the ends of the tube are removed, as by filing or by sawing off the ends of the tube. A substantially toroidal electrically conducting shell opened around the periphery to form two flanged portions and having the same mean diameter as the magnetostrictive tube is mounted on each end of the plated tube with flanged portions fastened to the inner and outer copper coating on the plated magnetostrictive tube. A complete single turn is thus obtained comprising the inner copper layer, the curved surface of one toroidal shell, the outer copper layer and the surface of the other toroidal shell at the other end of the tube. Because of the proximity of the winding (copper layers) and the magnetic circuit (magnetostrictive tube) the magnetic coupling is very close.

To raise the impedance to the desired value, a winding of several turns of relatively fine wire is wound about a solid toroidal magnetic core and the entire winding assembly, comprising the said winding and said core, is placed inside the toroidal shell before mounting the latter at the ends of the plated tube. Since the winding assembly is totally enclosed by the conducting shell and the end of the magnetostrictive tube, there is no leakage of flux from the winding. Moreover, since the winding assembly is located in proximity to the single turn secondary formed by the conducting layers and toroidal shell, the coefficient of coupling between the primary and secondary of the transformer is very large.

The hydrophone, according to this invention, may alternatively be constructed of a first electrically conducting tube, such as copper, having an outside diameter slightly smaller than the inside diameter of the insulated magnetostrictive tube and adapted to be inserted inside the latter, and a second copper tube whose inside diameter is slightly larger than the outside diameter of the insulated magnetostrictive tube and adapted to slide over the latter. With proper diameter tubes, a tight fit between the tubes may be obtained and the assembly held together by friction, or the assembly may be held together by insulated bolts located at convenient intervals. The hydrophone may be supported in any desired manner which will not unduly interfere with the vibratory movement of the magnetostrictive core.

Finally, the entire arrangement previously described may be mounted in a case, such as a rubber tube, and completely filled with oil in order to equalize the pressure.

By means of this invention, therefore, a much more efficient, compact and inexpensive hydrophone is obtained.

In the drawings:

Fig. 1 is a broken central longitudinal cross-sectional view of one form of the magnetostrictive transducer;

Fig. 2 is a view showing in detail the cross section of the compound tubular portion of the transducer of Fig. 1;

Fig. 3 is a detailed illustration of a portion of the toroidal winding assembly used in the transducer shown in Fig. 1;

Fig. 4 is a fragmentary cross-sectional view of a second form of the magnetostrictive transducer;

Fig. 5 is a broken cross-sectional view of the third form of a magnetostrictive tranducer; and Fig. 6 is a sectional view through the transducer of Fig. 5 taken along line 6—6.

Referring to Fig. 1, the magnetostrictive transducer or hydrophone 10 comprises a cylindrical tubular element 11 constructed of any suitable magnetostrictive material such as annealed nickel. The length and diameter of a nickel tube may be of the order of three feet and two inches, respectively, although the values given are merely illustrative. The radius of the tube may be substantially equal to the wave length of the compressional wave energy in the medium, such as sea water, into which the transducer is to be placed. The nickel tube is entirely covered with a relatively thin coating of insulation 12. This coating may be applied by painting or spraying the tube with shellac or some other substance which is an electrical insulator and capable of being applied in a thin layer to said tube. The oxidized surface of the nickel or an anodizing finish may also be used as an insulated coating. The coated tube 11, 12 is next covered with a thin layer of graphite 13 shown in Fig. 2. The graphite coating is omitted from Fig. 1 in order not to unduly complicate the essential structure of the device. The graphite covered tube 11, 12, 13 is plated by inserting it in a solution of cupric sulphate into which a copper anode is placed. By connecting the positive terminal of a source of direct current energy to the anode and the negative terminal to said coated nickel tube, the latter may be plated to any desired thickness 14 or 14'. The complete tube, including the insulation, graphite and copper plating, is designated in Figs. 1 and 2 by the reference numeral 15.

The coatings of insulation, graphite and copper plate, at the ends of the tube are removed by filing, grinding or by sawing off the ends of the tube. The complete tube 15 now has an end surface 25 as shown in Fig. 2 in which an inner conducting layer 14 and an outer conducting layer 14' are insulated from one another by the insulation 12.

A toroidal shell 16, formed of any electrical conducting material such as copper, is provided with flanged portions 19 and 20. A winding assembly comprising a toroidal core 17, preferably made of powdered iron, and a coil 18, including a plurality of turns of insulated wire wound toroidally about core 17, may be inserted in toroidal shell 16 by forcing the assembly into the opening between the springy flanged portions 19 and 20. Fig. 3 illustrates a portion of the toroidal magnetostrictive core 17, together with the turns of wire 18 wound circumferentially about said core. The wire may be covered with enamel or any other electrically insulating material. Several layers of wire may be wound about the core; the diameter of the winding assembly may be any desired value less than the internal diameter of toroidal shell 16.

Referring again to Fig. 1, coil 18 terminates in a pair of leads 22 and 23. A small circular opening 21 is provided in shell 16 to permit coil leads 22 and 23 to be brought out. The flanged portions 19 and 20 of toroidal shell 16 are brazed, soldered or otherwise fastened to the inner and outer copper plated layers 14 and 14', respectively.

A second toroidal shell 16' is mounted at the other end of said transducer with the flanged portions 19' and 20' being fastened to the inner and outer copper plated layers 14 and 14', respectively, as shown in Fig. 1.

Although a single coil 18 at either end of the tube may be sufficient, better coupling to the tube may be obtained by using a coil at each end, as shown in Fig. 1. A second winding assembly similar to the first and comprising a core 17' carrying a coil 18' may be mounted within the hollow space enclosed by toroidal shell 16'. A small circular opening 21' serves to bring out coil leads 22' and 23'. The two coils 18 and 18' are connected in series leading to an external circuit by connecting together leads 23 and 23'; the free ends of leads 22 and 22' are brought at one end of the transducer and are adapted to be connected either to a source of alternating current energy or to a suitable receiving apparatus, depending on whether the transducer is to act as a receiver or a transmitter.

To polarize the transducer tube it is initially magnetized by placing a heavy winding around the completed transducer and passing a heavy current impulse to said winding from a conventional condenser discharging network. This polarizing winding is removed before the transducer is used; once the transducer tube is magnetized, the remanence of the tube is relied upon to provide the necessary polarization or bias. By utilizing the remanence of the magnetostrictive tube the need for heavy and bulky permanent biasing magnets and a direct current biasing power supply in the transducer equipment is eliminated.

Referring now to Fig. 4, a modification of the tubular magnetostrictive transducer of Fig. 1 is shown. Instead of copper plating the coated magnetostrictive tube, a first electrically conducting tube 34, preferably made of copper, and having an outer diameter slightly smaller than the inner diameter of the coated magnetostrictive tube 11, 12 is inserted within the latter. A second copper tube 34' having an inner diameter slightly larger than the outer diameter of said coated magnetostrictive tube is slipped over the outside of the latter. Flanged portions 19 and 20 of a toroidal electrically conducting shell 16 are soldered or otherwise connected along the top edges of copper tubes 34 and 34', respectively, as shown in Fig. 5. Oil (not shown) may be placed in the interstices between said coated tubes 11, 12 and the copper tube, if desired, in order to equalize the pressure on the transducer tube. A winding assembly may be inserted in the space within shell 16, just as in Fig. 1.

In Figs. 5 and 6, a third modification of a magnetostrictive transducer is shown. A transducer 10, such as shown in either Figs. 1 or 4, is mounted within case 40 which is constructed of a material, such as rubber, which has substantially the same characteristics for transmission of compressional wave energy (that is the same density and acoustical impedance) as sea water or other medium in which the transducer is to be placed. A pair of spiders 41 and 41' serves to mount the transducer body 10 within said case. The invention, however, is not to be limited to the specific mounting structure shown in Figs. 5 and 6 since other means of mounting the transducer body within the case may be used.

The upper end of the case may be sealed by means of a discoidal end cap 42, which may be made of any suitable metal. A clamp 43 is used to hold the end cap firmly against the top of rubber case 40. If desired, the tubular rubber case may be open at both ends and the end closures in the form of clamp end caps may be used at both the top and bottom ends of the case. Other types of end closures may, of course, be used. A hollow coupling 45 is inserted in end plate 42 through which the coil leads may be brought out. The interior of the case not occupied in the transducer body 10 and spiders 41 and 41' may be filled with oil for equalization of pressure.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A magnetostrictive transducer comprising a tubular magnetostrictive element whose inner and outer surfaces are covered with a thin coating of insulation, first and second cylindrical electrically conductive layers covering said inner and outer coated surfaces, respectively, of said element, an electrically conductive member mounted one at each end of said element, each of said conductive members connecting together said first and second conductive layers at the corresponding end to form a single conductive turn surrounding said magnetostrictive element and closely spaced therefrom, and a toroidally wound coil positioned within each of said conductive members, said coils being connected in series aiding.

2. A magnetostrictive transducer comprising a tubular magnetostrictive element whose inner and outer surfaces are covered with a thin coating of insulation, first and second cylindrical electrically conductive layers covering said inner and outer coated surfaces, respectively, of said element, a split toroidal electrically conductive shell having inner and outer flanged portions and mounted one at each end of said element, said inner and outer flanged portions of said shell being connected to said inner and outer conductive layers, respectively, to form a single conductive turn surrounding said magnetostrictive element and closely spaced therefrom, and a toroidally wound coil positioned within each of said toroidal shells, said coils being connected in series aiding.

3. A magnetostrictive transducer comprising a closed tubular casing made of a material having a density and compressional wave impedance substantially equal to that of the medium in which said transducer is placed, a tubular magnetostrictive element mounted within said casing, said element having its inner and outer surfaces covered with a thin coating of insulation, first and second cylindrical electrically conductive layers covering said inner and outer coated surfaces, respectively, of said element, a hollow electrically conductive member mounted one at each end of said element, and each adapted to connect together said first and second conductive layers at the corresponding end to form a single conductive turn surrounding said magnetostrictive element and closely spaced therefrom, and a toroidally wound coil positioned within each of said conductive members, said coils being connected in series aiding.

4. A magnetostrictive transducer comprising a closed tubular casing made of a material having a density and compressional wave impedance substantially equal to that of the medium in which said transducer is placed, a tubular magnetostrictive element mounted within said casing, said element having its inner and outer surfaces covered with a thin coating of insulation, first and second cylindrical electrically conductive layers covering the said inner and outer coated surfaces, respectively, of said element, a split toroidal electrically conductive shell having inner and outer flanged portions and mounted one at each end of said element, said inner and outer flanged portions of said shell being connected to said first and second conductive layers, respectively, at the corresponding end, said shells and said conductive layers combining to form a single conductive turn surrounding said magnetostrictive element and closely spaced therefrom, and a toroidally wound coil positioned within each of said toroidal shells, said coils being connected in series aiding.

5. A magnetostrictive transducer comprising a tubular magnetostrictive element whose inner and outer surfaces are covered with a thin coating of insulation, first and second cylindrical electrically conductive layers covering said inner and outer coated surfaces, respectively, of said element, an electrically conductive member mounted one at each end of said element, each of said conductive members connecting together said first and second conductive layers at the corresponding end to form a single conductive turn surrounding said magnetostrictive element and closely spaced therefrom, and a toroidally wound coil positioned within each of said conducting members and in close coupling relationship with said conductive turn, said coils being connected in series aiding.

6. A magnetostrictive transducer comprising a tubular magnetostrictive element whose inner and outer surfaces are covered with a thin coating of insulation, first and second cylindrical electrically conductive layers covering said inner and outer coated surfaces, respectively, of said element, an electrically conductive member mounted one at each end of said element, each of said conductive members connecting together said first and second conductive layers at the corresponding end to form a single conductive turn surrounding said magnetostrictive element and closely spaced therefrom, and a coil positioned within one of said conductive members and in close coupling relationship with said conductive turn.

7. A magnetostrictive transducer comprising a tubular casing made of a material having a density and compressional wave impedance substantially equal to that of the medium in which said transducer is placed and containing a pressure-equalizing liquid, a tubular magnetostrictive element mounted within said casing, said element having its inner and outer surfaces covered with a thin coating of insulation, first and second cylindrical electrically conductive layers covering said inner and outer coated surfaces, respectively, of said element, a hollow electrically conductive member mounted one at each end of said element and each adapted to connect together said first and second conductive layers at the corresponding end to form a single conductive turn surrounding said magnetostrictive element and closely spaced therefrom, and a coil positioned within one of said conductive members and in close coupling relationship with said conductive turn.

8. A magnetostrictive transducer comprising a tubular casing made of a material having a density and compressional wave impedance substantially equal to that of the medium in which said transducer is placed and containing a pressure-equalizing liquid, a tubular magnetostrictive element mounted within said casing, said element having its inner and outer surfaces covered with a thin coating of insulation, first and second cylindrical electrically conductive layers covering said inner and outer coated surfaces, respectively, of said element, a hollow electrically conductive member mounted one at each end of said element and each adapted to connect together said first and second conductive layers at the corresponding end to form a single conductive turn surrounding said magnetostrictive element and closely spaced therefrom, and electromagnetic coupling means positioned within said conductive members and in close coupling relationship with said conductive turn.

9. A magnetostrictive transducer comprising a tubular casing made of a material having a density and compressional wave impedance substantially equal to that of the medium in which said transducer is placed and containing a pressure-equalizing liquid, a tubular magnetostrictive element mounted within said casing, said element having its inner and outer surfaces covered with a thin coating of insulation, first and second cylindrical electrically conductive layers covering said inner and outer coated surfaces, respectively, of said element, a split toroidal electrically conductive shell having inner and outer flanged portions and mounted one at each end of said element, said inner and outer flanged portions of said shell being connected to said first and second conductive layers, respectively, to form a single conductive turn surrounding said magnetostrictive element and closely spaced therefrom, and electromagnetic coupling means positioned within each of said toroidal shells and in close coupling relationship with said conductive turn.

10. A magnetostrictive transducer comprising a tubular casing made of a material having a density and compressional wave impedance substantially equal to that of the medium in which said transducer is placed and containing a pressure-equalizing liquid, a tubular magnetostrictive element mounted within said casing, said element having its inner and outer surfaces covered with a thin coating of insulation, first and second cylindrical electrically conductive layers covering said inner and outer coated surfaces, respectively, of said element, a split toroidal electrically conductive shell having inner and outer flanged portions and mounted one at each end of said element, said inner and outer flanged portions of said shell being connected to said first and second conductive layers, respectively, to form a single conductive turn surrounding said magnetostrictive element and closely spaced therefrom, a toroidal magnetic core, and a coil wound about said core, said coil and core being positioned within each of said toroidal shells and in close coupling relationship with said conductive turn, said coils being connected in series aiding.

EDWIN E. TURNER.

References Cited in the file of this patent
UNITED STATES PATENTS

| Number | Name | Date |
|---|---|---|
| 2,472,388 | Thuras | June 7, 1949 |